United States Patent [19]
Nishimura et al.

[11] Patent Number: 5,629,390
[45] Date of Patent: May 13, 1997

[54] METHOD FOR PRODUCING A POLYOLEFIN

[75] Inventors: Sadaki Nishimura, Yokkaichi; Yutaka Naito; Toshikazu Chikusa, both of Mie-ken; Mitsuhiro Mori, Aichi-ken; Yozo Kondo, Yokkaichi, all of Japan

[73] Assignee: Tosoh Corporation, Sinnanyo, Japan

[21] Appl. No.: 648,866

[22] Filed: May 16, 1996

Related U.S. Application Data

[63] Continuation of Ser. No. 502,855, Jul. 14, 1995, abandoned, which is a continuation of Ser. No. 100,186, Aug. 2, 1993, abandoned, which is a continuation of Ser. No. 673,077, Mar. 21, 1991, abandoned.

[30] Foreign Application Priority Data

| Mar. 23, 1990 | [JP] | Japan | 2-072140 |
| Apr. 2, 1990 | [JP] | Japan | 2-084823 |
| Aug. 1, 1990 | [JP] | Japan | 2-202474 |
| Jan. 30, 1991 | [JP] | Japan | 3-027660 |

[51] Int. Cl.$^6$ ............................ C08F 4/654; C08F 4/655
[52] U.S. Cl. .................. 526/114; 526/119; 526/124.4; 526/124.8; 526/125.6; 502/110; 502/113; 502/115; 502/116
[58] Field of Search .................. 526/114, 119, 526/124.4, 124.8, 125.6

[56] References Cited

U.S. PATENT DOCUMENTS

| 4,518,751 | 5/1985 | Mizogami et al. | 526/114 |
| 4,804,726 | 2/1989 | Kondo et al. | 526/124 |
| 5,037,910 | 8/1991 | Cook et al. | 526/128 |
| 5,118,769 | 6/1992 | Kondo et al. | 526/128 |
| 5,145,818 | 9/1992 | Tsutsui et al. | 502/113 |
| 5,225,502 | 7/1993 | Sato et al. | 526/128 |

FOREIGN PATENT DOCUMENTS

| 0230707 | 8/1987 | European Pat. Off. . | |
| 0275317 | 7/1988 | European Pat. Off. . | |
| 294168 | 7/1988 | European Pat. Off. . | |
| 57-200406 | 12/1982 | Japan | 526/124 |
| 61-2709 | 1/1986 | Japan | 526/124 |

*Primary Examiner*—Romulo H. Delmendo
*Attorney, Agent, or Firm*—Oblon, Spivak, McClelland, Maier & Neustadt, P.C.

[57] ABSTRACT

A method for producing a polyolefin in the presence of a catalyst comprising a transition metal compound and an organometallic compound, wherein a catalyst system is used which comprises: (A) a solid catalyst component prepared by reacting a uniform solution containing (I) at least one member selected from the group consisting of metal magnesium and a hydroxylated organic compound, and oxygen-containing organic compounds of magnesium, (II) an electron donative compound and (III) an oxygen-containing organic compound of titanium, with (IV) at least one aluminum halide compound to obtain a solid product, adding to this solid product (V) at least one compound selected from the group consisting of oxygen-containing organic compounds of one or more transition metals of Group IVa of the Periodic Table, and then treating the mixture with (VI) an aluminum halide compound, and (B) at least one catalyst component selected from the group consisting of organoaluminum compounds. A polymer having a desired molecular weight distribution and good configuration of particles can be obtained while maintaining high activity by the method of the present invention.

11 Claims, No Drawings

METHOD FOR PRODUCING A POLYOLEFIN

This application is a Continuation of application Ser. No. 08/502,855, filed on Jul. 14, 1995, now abandoned which is a Continuation of application Ser. No. 08/100,186, filed on Aug. 2, 1993, abandoned which is a Continuation of application Ser. No. 07/673,077, filed on Mar. 21, 1991, abandoned.

This invention relates to a method for producing a polyolefin. More particularly, this invention relates to a method which enables to obtain a polymer having a desired molecular weight distribution and a good configuration of particles while maintaining high catalytic activity in polymerizing at least one olefin.

It is already known to use a catalyst system comprising a transition metal compound and an organometallic compound for low-pressure polymerization of olefins. In recent years, a large number of proposals have been made for producing, as a highly active catalyst, a solid catalyst component comprising magnesium, titanium and halogen as main components.

However, to obtain higher productivity, it is very important from the industrial viewpoint to aim not only at high catalytic activity but also at improving the particle size, the bulk density and the like of polymer particles. At the same time, it is now demanded to optionally control the molecular weight distribution of the resulting polymer for satisfying the diversification of qualities.

In Japanese Examined Patent Publication No. 15110/1977, the present inventors have proposed a catalyst system which exhibits quite high catalytic activity in producing polyolefins and which comprises a catalyst component (A) obtained by reacting magnesium metal and a hydroxylated organic compound, or an oxygen-containing organic compound of magnesium, an oxygen-containing organic compound of a transition metal and an aluminum halide, and a catalyst component (B) of an organometallic compound. However, polymer particles obtained in the presence of such catalyst are still not satisfactory in the powder properties because the average particle size is small, the particle size distribution is broad, and the proportion of fine particles contained in the polymer particles is high.

That is, with such particle size distribution, various troubles are caused during the production of a polyolefin, for example, in the steps of polymerization, separation of the particles from the polymer slurry, drying of the powder and transportation of the powder, and in some cases, long-term continuous production becomes impossible. Further, when a polymer is obtained by multi-stage polymerization, if the particle size distribution of the polymer particles is broad, classification of the powder is liable to occur even after the drying step, i.e. at the stage where additives are added or at the stage of transportation, thus adversely affecting the quality because the physical properties differ from particle to particle, which can not be ignored sometimes. Further, in a gas phase polymerization, particle properties are particularly important in view of productivity because, if the powder properties are poor, blocking or the like of polymer particles occurs in the polymerization reactor.

As a method for overcoming the above problems, the present inventors previously found that the particle size of a polymer could be increased by using a silicon compound in addition to the raw materials for a catalyst component (A) disclosed in Japanese Examined Patent Publication No. 15110/1977, and filed a patent application i.e. Japanese Examined Patent Publication No. 58367/1987, but such method could not lead to an improvement in the particle size distribution.

On the other hand, in Japanese Examined Patent Publication No. 39714/1977, the present inventors already proposed a polymerization method which can produce a polyolefin having a desired molecular weight distribution while maintaining high catalytic activity by employing a catalyst system comprising a reaction product of metal magnesium, a hydroxylated organic compound, an organic oxidized compound of a transition metal, a halogen-containing compound of a transition metal and an aluminum halide with an organometallic compound, but it was still insufficient from the viewpoint of improvement in the particle properties such as the particle size, bulk density and the like of polymer particles.

A serious problem which usually occurs in conducting polymerization is soiling of a reactor (deposition of a solid polymer on the inner surface of the reactor), whereby it is necessary to stop the polymerization operation to remove the deposition. Such a problem tends to be remarkable particularly in producing a resin having a broad molecular weight distribution such as the one to be used for blow molding, extrusion molding or the like.

Further, in Japanese Examined Patent Publication No. 48682/1987, the present inventors already proposed a method for eliminating the above defects. In this method, a catalyst system is employed which comprises a solid catalyst component (A) obtained by reacting metal magnesium and a hydroxylated organic compound, or oxygen-containing organic compound or a halogen-containing compound of magnesium, with an oxygen-containing organic compound or a halogen-containing compound of titanium, an oxygen-containing organic compound or a halogen-containing compound of zirconium, a silicon compound, and an aluminum halide compound, and a catalyst component (B) of an organometallic compound.

However, this method could not lead to an improvement in the particle size distribution.

The present inventors have now found that a polymer having a desired molecular weight distribution and good powder properties can be obtained while maintaining high catalytic activity by conducting the polymerization of an olefin in the presence of a novel catalyst system, and accomplished the present invention.

That is, the present invention is a method for producing a polyolefin in the presence of a catalyst comprising a transition metal compound and an organometallic compound, wherein a catalyst system is used which comprises:

(A) a solid catalyst component prepared by reacting a homogeneous solution containing (I) at least one member selected from the group consisting of metal magnesium and a hydroxylated organic compound, and oxygen-containing organic compounds of magnesium, (II) an electron donative compound and (III) an oxygen-containing organic compound of titanium, with (IV) at least one aluminum halide compound to obtain a solid product, adding to this solid product (V) at least one compound selected from the group consisting of oxygen-containing organic compounds of one or more transition metals of Group IVa of the Periodic Table, and then treating the mixture with (VI) an aluminum halide compound, and (B) at least one catalyst component selected from the group consisting of organoaluminum compounds.

Metal magnesium and a hydroxylated organic compound, and oxygen-containing compounds of magnesium that are reactant (I) to be used in the present invention are described below.

First, when metal magnesium and a hydroxylated organic compound are used, metal magnesium can take any form such as powdery form, granular form, foil form, and ribbon form, and as the hydroxylated organic compound, alcohols, organosilanols, and phenols are suitable.

As the alcohols, linear or branched aliphatic alcohols having 1 to 18 carbon atoms or alicyclic alcohols can be used. Specific examples include methanol, ethanol, n-propanol, i-propanol, n-butanol, i-butanol, n-hexanol, 2-ethylhexanol, n-octanol, n-stearyl alcohol, cyclopentanol, cyclohexanol, and ethylene glycol.

The organosilanols are those having at least one hydroxyl group and an organic group selected from an alkyl group, a cycloalkyl group, an arylalkyl group, an aryl group, and an alkylaryl group with 1 to 12, preferably 1 to 6, carbon atoms. For example, trimethylsilanol, triethylsilanol, triphenylsilanol, and t-butyldimethylsilanol may be mentioned. As phenols, phenol, cresol, xylenol, and hydroquinone may be mentioned.

These hydroxylated organic compounds can be used alone or as a mixture of two or more of them.

In addition, when metal magnesium is used to prepare a solid catalyst component of the present invention, for the purpose of accelerating the reaction, it is preferable to add one or more substances that will react with metal magnesium or form an adduct, e.g. polar substances such as iodine, mercuric chloride, halogenated alkyls, organic acid esters, and organic acids.

As compounds belonging to the oxygen-containing organic compounds of magnesium, the following compounds may, for example, be mentioned: magnesium alkoxides such as magnesium methylate, magnesium ethylate, magnesium isopropylate, magnesium decanolate, magnesium methoxyethylate and magnesium cyclohexanolate, magnesium alkylalkoxides such as magnesium ethylethylate, magnesium hydroalkoxides such as magnesium hydroxymethylate, magnesium phenoxides such as magnesium phenate, magnesium naphthenate, magnesium phenanthlenate and magnesium cresolate, and magnesium carboxylates such as magnesium acetate, magnesium stearate, magnesium benzoate, magnesium phenylacetate, magnesium adipate, magnesium sebacate, magnesium phthalate, magnesium acrylate, and magnesium oleate.

Further, also employed are oxygen-containing organic magnesium compounds which also contain nitrogen, namely, compounds having magnesium-oxygen-nitrogen-organic group bond in this order, for example, magnesium oxymates such as magnesium butyloxymates, magnesium dimethylglyoxymates and magnesium cyclohexyloxymate, magnesium hydroxamate salts, and magnesium hydroxylamine salts such as N-nitroso-N-phenyl-hydroxylamine derivatives.

Further, there may also be employed magnesium chelates i.e. oxygen-containing organic magnesium compounds in which magnesium has at least one magnesium-oxygen-organic group bond in this order and further at least one coordination bond to form a magnesium-containing heterocyclic ring, for example, magnesium enolates such as magnesium acetylacetonate, and complexes obtained from phenol derivatives having an electron donative group at the ortho position or meta position to the hydroxyl group, such as magnesium 8-hydroxy quinolinate.

Also, magnesium silanolates, i.e. compounds containing a magnesium-oxygen-silicon-hydrocarbon group bond in this order, for example, magnesium triphenyl silanolate, may be mentioned.

This series of the oxygen-containing organic compounds may, of course, include compounds containing several different organic groups such as magnesium methoxyethylate, and complex alkoxides or phenoxides of magnesium and other metals, such as, $Mg[Al(OC_2H_5)_4]_2$ and $Mg_3[Al(OC_2H_5)_6]_2$. These oxygen-containing organic magnesium compounds are used alone or as a mixture of two or more of them.

As the electron donative compound for the abovementioned reactant (II), ethers, esters, ketones, phenols, amines, amides, imines, nitriles, phosphines, arsines, and alcoholates may be mentioned.

There may be mentioned as ethers, dimethyl ether, diethyl ether and the like; as ketones, acetone, methyl ethyl ketone and the like; as phenols, phenol, cresol and the like; as amines, trimethylamine, triethylamine and the like; as amides, amide acetate, amide benzoate and the like; as imines, ethyleneimine, piperidine and the like; as nitriles, acetonitrile, benzonitrile and the like; as phosphines, ethylphosphine, phenylphosphine and the like; as arsines, ethylarsine, chlorodimethylarsine and the like.

Among them, esters are preferred, and organic esters are most preferred.

As the organic esters, mono or diester of an aromatic carboxylic acid, mono or diester of an aliphatic carboxylic acid and the like may be mentioned.

Specific examples include, for example, butyl formate, ethyl acetate, butyl acetate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl adipate, dibutyl sebacate, diethyl maleate, dibutyl maleate, diisobutyl maleate, monomethyl fumarate, diethyl fumarate, diisobutyl fumarate, diethyl tartarate, dibutyl tartarate, diisobutyl tartarate, methyl benzoate, ethyl benzoate, methyl p-toluate, ethyl p-tert butylbenzoate, ethyl p-anisate, ethyl α-naphthoate, isobutyl α-naphthoate, ethyl cinnamate, monomethyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, diisobutyl isophthalate, diethyl terephthalate, dibutyl terephthalate, diethyl naphthalate and dibutyl naphthalate. Such electron donative compounds (II) may be used alone or in combination as a mixture of two or more different types.

As the oxygen-containing organic compound of titanium for the above-mentioned reactant (III), a compound represented by the general formula $[TiO_a(OR^1)_bX^1_c]_m$ is used, in which $R^1$ represents a hydrocarbon group such as a linear or branched alkyl group, a cycloalkyl group, an arylalkyl group, an aryl group, and an alkylaryl group, having 1 to 20, preferably 1 to 10, carbon atoms, $X^1$ represents a halogen atom, i.e. F, Cl, Br or I, a, b and c are such that $a \geq 0$, $b > 0$ and $4 \geq c > 0$ and they are numbers agreeable with the valence of titanium, and m is an integer. It is particularly preferred to use an oxygen-containing organic compound in which a is $0 \leq a \leq 1$ and m is $1 \leq m \leq 6$.

As specific examples, $Ti(OC_2H_5)_4$, $Ti(O-n-C_3H_7)_4$, $Ti(O-i-C_3H_7)_4$, $Ti(O-n-C_4H_9)_4$, $Ti_2O(O-i-C_3H_7)_6$, $Ti(OC_2H_5)_2Cl_2$ and, $Ti(OC_2H_5)_3Cl$ may be mentioned. Use of an oxygen-containing organic compound having different hydrocarbon groups falls within the scope of the present invention. These oxygen-containing organic compounds are used alone or as a mixture of two or more of them.

As the aluminum halide compound for the abovementioned reactants (IV) and (VI), those represented by the general formula $AlR^2{}_k X^2{}_{3-k}$ may be used. In the formula, $R^2$ represents a hydrocarbon group having from 1 to 20, preferably 1 to 6, carbon atoms, represents a $X^2$ halogen atom, i.e. F, Cl, Br or I, and k is such a number that $0<k<3$. It is preferable that $R^2$ is selected from a linear or branched alkyl group, an alkoxy group, a cycloalkyl group, an arylalkyl group, an aryl group and an alkylaryl group.

The above aluminum halide compounds may be used alone or as a mixture of two or more of them.

Specific examples of the aluminum halide compound include, for example, ethyl aluminum dichloride, n-propylaluminum dichloride, n-butylaluminum dichloride, i-butylaluminum dichoride, ethylaluminum sesquichloride, i-butylaluminum sesquichloride, i-propylaluminum sesquichloride, n-propylaluminum sesquichloride, diethylaluminum chloride, di-i-propylaluminum chloride, di-n-propylaluminum chloride, di-i-butylaluminum chloride, diethylaluminum bromide, and diethylaluminum iodide.

As the oxygen-containing organic compound of a transition metal (M) of Group IVb of the Periodic Table for the above-mentioned reactant (V), a compound represented by the formula $[MO_p(OR^3)_q X^3{}_j]_n$ may be used. In the formula, $R^3$ represents a hydrocarbon group, such as a linear or branched alkyl group, a cycloalkyl group, an arylalkyl group, an aryl group or an alkylaryl group, having from 1 to 20, preferably from 1 to 10, carbon atoms, and $X^3$ represents a halogen atom, i.e. F, Cl, Br or I. p, q and j are such that $p \geq 0$, $q>0$, and $4>j\geq 0$, and they are numbers agreeable with the valence of M, and n is an integer. It is particularly preferred to use an oxygen-containing organic compound wherein p is $0 \leq p \leq 1$ and n is $1 \leq n \leq 6$.

As specific examples, there may be mentioned $Ti(OC_2H_5)_4$, $Ti(O-n-C_3H_7)_4$, $Ti(O-i-C_3H_7)_4$, $Ti(O-n-C_4H_9)_4$, $Ti_2(O-i-C_3H_7)_6$, $Zr(OC_2H_5)_4$, $Zr(O-n-C_3H_7)_4$, $Zr(O-i-C_3H_7)_4$, $Zr(O-n-C_4H_9)_4$, $Zr_2O(O-i-C_3H_7)_6$, $Hf(O-n-C_4H_9)_4$, $Hf(OC_2H_5)_4$, $Hf(OC_6H_5)_4$, and $Hf(OCH_2CH(C_2H_5)C_4H_9)_4$.

Further, compounds represented by the formulas $R^4 R^5 M(OR^3)_2$ or $R^6 O=M OR^3)_2$ fall within the scope of the present invention. In these formulas, $R^3$ is as defined above, each of $R^4$ and $R^5$ represents a cycloalkadienyl group an indenyl group or a fluorenyl group, and $R^6 O_2=$ represents an ethylenedioxy group, a propylenedioxy group, a butanedioxy group, a thiobisphenoxy group or an ethylenebisphenoxy group.

As specific examples, there may be mentioned bis(cyclopentadienyl)titaniumdimethoxide, bis(cyclopentadienyl)zirconiumdimethoxide, bis(cyclopentadienyl)hafniumdimethoxide, ethylenebis(indenyl)zirconiumdimethoxide, ethylenebis(indenyl)hafniumdimethoxide, bis(fluorenyl)zirconiumdimethoxide, bis(fluorenyl)hafniumdimethoxide, propylenedioxytitaniumdiisopropoxide, propylenedioxyzirconiumdiisopropoxide, propylenedioxyhafniumdiisopropoxide, thiobisphenoxytitaniumdiisopropoxide, thiobisphenoxyzirconiumdiisopropoxide, and thiobisphenoxyhafniumdiisopropoxide.

In this invention, at least one compound is employed which is so selected from these oxygen-containing organic compounds of transition metals that it may contain one or more transition metals. That is, this invention includes use of a single oxygen-containing organic compound of Ti, Zr or Hf, use of a combination of oxygen-containing organic compounds of two or more transition metals such as Ti and Zr, Ti and Hf, Zr and Hf, and Ti, Zr and Hf, and use of a combination of different types of oxygen-containing organic compounds of the same transition metal. When two or more transition metals are used, it is preferred to use oxygen-containing organic compounds of Ti and Zr. Respective oxygen-containing organic compounds of transition metals may be used in an optional ratio, but, from the viewpoint of control of the molecular weight distribution, for example, when oxygen-containing organic compounds of Ti and Zr are used, the ratio of the oxygen-containing organic compound of Ti to the oxygen-containing organic compound of Zr is preferably selected within a range from 1:0.01 to 1:100, more preferably from 1:0.1 to 1:50.

The amounts of the reactants (I), (II), (III), (IV), (V) and (VI) to be used in this invention are not particularly limited, but it is preferred to select the amounts so that the molar ratio of magnesium atom (I) to the electron donative compound (II) will be from 1:0.05 to 1:5, particularly from 1:0.1 to 1:2.

It is preferred to select the amounts so that the ratio of magnesium atom (I) to titanium atom (III) will be from 1:0.01 to 1:20, preferably from 1:0.1 to 1:5.

It is preferred to select the amounts of the reactants so that the ratio of magnesium atom to aluminum atom in the aluminum halide compound (IV) ranges from 1:0.01 to 1:100, preferably 1:0.02 to 1:20. Particularly, good powder properties can be obtained by selecting the range of from 1:0.05 to 1:10.

It is preferred to select the amounts of the reactants so that the ratio of magnesium atom (I) to metal atom in the transition metal compound (V) of Group IVb of the Periodic Table ranges from 1:0.01 to 1:10, preferably 1:0.05 to 1:5. If the ratio is outside this range, problems may arise such that the polymerization activity lowers and the product is colored.

It is also preferred that the ratio of magnesium atom (I) to aluminum atom in the aluminum halide compound (VI) ranges from 1:0.02 to 1:100, preferably 1:0.1 to 1:50. In this range, the bulk density of a polymer becomes higher and the effect for improvement of the powder properties can be seen.

The catalyst preparation reactions are preferably conducted in a liquid medium. Therefore, when these reactants are not liquid by themselves under the operating conditions, or when the amount of liquid reactants is not sufficient, the reaction can be conducted in the represence of an inert organic solvent. As such an inert organic solvent, any solvent which is commonly used in this technical field may be employed. As the solvent, an aliphatic, alicyclic or aromatic hydrocarbon or a halogen derivative thereof, or a mixture thereof may be mentioned. For example, isobutane, hexane, heptane, cyclohexane, benzene, toluene, xylene or monochlorobenzene may be preferably used.

The reaction conditions for obtaining a homogeneous solution from the reactants (I), (II) and (III) are at a temperature of from $-50°$ to $300°$ C., preferably from $0°$ to $200°$ C., for 0.5 to 50 hours, preferably 1 to 6 hours, under an ordinary pressure or an elevated pressure in an inert gas atmosphere. Further, when the reactant (IV) is used for the reaction, the reaction is conducted at a temperature ranging from $-50°$ to $200°$ C., preferably from $-30°$ to $100°$ C., for 0.2 to 50 hours, preferably 0.5 to 5 hours, in an inert gas atmosphere or under an elevated pressure.

The solid product thus prepared is particles insoluble in a solvent to be used as a diluent. After the solid product is freed from remaining unreacted substances and by-products by filtering or decantation, the solid product is washed with an inert solvent several times, then suspended in an inert solvent, and subjected to the contact reactions with the reactant (V) and the reactant (VI) to obtain a solid catalyst component (A). The reactions with the reactant (V) and the reactant (VI) are conducted at a temperature ranging from −50° to 200° C., preferably from −30° to 100° C., for 0.2 to 50 hours, preferably 0.5 to 5 hours, in an inert gas atmosphere or under an elevated pressure.

To obtain a polymer having good powder properties, it is preferred to add a silicon compound when the above solid product and the reactant (V) are subjected to the contact reactions. The reactant (V) and the silicon compound may be added at the same time or may be added separately. There is no restriction in the order of addition of the respective compounds.

As the silicon compound, the following polysiloxanes and silanes may be used.

As polysiloxanes, siloxane polymers of a linear, cyclic or three-dimensional structure may be mentioned which have one or more repeating units of the general formula:

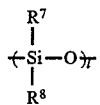

wherein $R^7$ and $R^8$ may be the same or different and each represents an atom or a residual group that can bond to the silicon, for example, a hydrocarbon group such as an alkyl group or an aryl group, having from 1 to 12 carbon atoms, hydrogen, a halogen, or an alkoxy group, an aryloxy group or a fatty acid residue, having from 1 to 12 carbon atoms, and l is usually an integer of from 2 to 10,000, in various proportions and distributions in the molecule, except for the case where $R^7$ and $R^8$ are all hydrogen or halogen.

Specifically, the linear polysiloxanes may, for example, be hexamethyldisiloxane, octamethyltrisiloxane, dimethylpolysiloxane, diethylpolysiloxane, methylethylpolysiloxane, methylhydropolysiloxane, ethylhydropolysiloxane, butylhydropolysiloxane, hexaphenyldisiloxane, octaphenyltrisiloxane, diphenylpolysiloxane, phenylhydropolysiloxane, methylphenylpolysiloxane, 1,5-dichlorohexamethyltrisiloxane, 1,7-dichlorooctamethyltetrasiloxane, dimethoxypolysiloxane, diethoxypolysiloxane, and diphenoxypolysiloxane.

The cyclic polysiloxanes may, for example, be hexamethylcyclotrisiloxane, octamethylcyclotetrasiloxane, decamethylcyclopentasiloxane, 2,4,6-trimethylcyclotrisiloxane, 2,4,6,8-tetramethylcyclotetrasiloxane, triphenyltrimethylcyclotrisiloxane, tetraphenyltetramethylcyclotetrasiloxane, hexaphenylcyclotrisiloxane, and octaphenylcyclotetrasiloxane.

The polysiloxanes having a three-dimensional structure may, for example, be those obtained by heating the above linear or cyclic polysiloxanes to let them have a crosslinked structure.

These polysiloxanes are preferably liquid for the convenience in handling, and it is desirable that they have a viscosity within a range of from 1 to 10,000 centistokes, preferably from 1 to 1,000 centistokes, at 25° C. However, they are not necessarily limited to liquid polysiloxanes, and they may be solid that are generally called silicon grease.

As the silanes, compounds represented by the general formula $H_r Si_s R^9_t X^4_u$ wherein $R^9$ represents a group that can bond to the silicon, for example, a hydrocarbon group such as an alkyl group or an aryl group, having from 1 to 12 carbon atoms, or an alkoxy group, an aryloxy group or a fatty acid residue, having 1 to 12 carbon atoms, and $R^9$ each may be the same or different; $X^4$ may be the same or different and each represents a halogen i.e. F, Cl, Br or I; r, t and u each is an integer of 0 or more, s is a natural number, can be mentioned.

Specifically, they include, for example, silanhydrocarbons such as trimethylphenylsilane and allyltrimethylsilane, linear and cyclic organic silanes such as hexamethyldisilane and octaphenylcyclotetrasilane, organic silanes such as methylsilane, dimethylsilane and trimethylsilane, silicon halides such as silicon tetrachloride and silicon tetrabromide, alkyl and aryl halogenosilanes such as dimethyldichlorosilane, diethyldichlorosilane, n-butyltrichlorosilane, diphenyldichlorosilane, triethylfluorosilane and dimethyldibromosilane, alkoxysilanes such as trimethylmethoxysilane, dimethyldiethoxysilane, tetramethoxysilane, tetraethoxysilane, diphenyldiethoxysilane, tetramethyldiethoxydisilane and dimethyl tetraethoxydisilane, haloalkoxysilanes such as dichlorodiethoxysilane, dichlorodiphenylsilane and tribromoethoxysilane and silane compounds containing a fatty acid residue such as phenoxysilane, trimethylacetoxysilane, diethyldiacetoxysilane and ethyltriacetoxysilane.

The above organosilicon compounds may be used alone or two or more of them may be mixed or reacted for use.

The silicon compound is used in such an amount that the atomic ratio of the silicon atom to the transition metal atom (M) in the oxygen-containing organic compound (V) of Group IVb of the Periodic Table is in the range of Si/M=0.01 to 20, preferably 0.02 to 10.

The ratio of the silicon atom and the transition metal atom (M) in the oxygen-containing organic compound (V) of a transition metal of Group IVb of the Periodic Table to the magnesium atom is desirably such that (M+Si)/Mg=1:0.01 to 1:10, preferably from 1:0.05 to 1:5. If the ratio is outside this range, no adequate improvement of the powder properties can be expected.

The solid catalyst component (A) may be used as such, but usually it is used after having the residual unreacted materials and by-products removed by filtration or decantation, washing it with an inert solvent several times, and suspending it in an inert solvent. Also, the one isolated after washing and heated under ordinary pressure or a reduced pressure to remove the solvent can be used.

Further, the solid catalyst component (A) is preferably prepolymerized with 0.01 to 50 g of ethylene or α-olefin having three or more carbon atoms per g of the solid catalyst component (A) in an inert hydrocarbon solvent. The monomer to be used for the prepolymerization may be a single monomer or a combination of two or more monomers. When two or more monomers are used for the prepolymerization, the prepolymerization can be conducted one after another or at the same time. In the prepolymerization, the organoaluminum compound is preferably used in a ratio of from 0.1 to 1000 to the titanium atom in the solid catalyst component (A). The electron donative compound may be used in a proportion of from 0.01 to 10 to the titanium atom in the solid catalyst component.

In this invention, as the catalyst component (B), an organoaluminum compound is used.

As the organic group of the catalyst component (B), an alkyl group may be mentioned as a typical example. As the alkyl group, a linear or branched alkyl group having 1 to 20 carbon atoms may be used. Specifically, trimethylaluminum, triethylaluminum, tri-i-butylaluminum, tri-n-butylaluminum, or tri-n-decylaluminum may, for example, be mentioned. It is particularly preferred to use a trialkylaluminum having a linear or branched alkyl group having 1 to 10 carbon atoms. There may also be used one having an alkyl group with 1 to 20 carbon atoms, for example, an alkylaluminum halide such as ethylaluminum sesquichloride, diethylaluminum chloride or diisobutylaluminum chloride, or an alkylaluminum alkoxide such as diethylaluminum ethoxide.

These organoalminum compounds may be used singly or as a mixture of two or more of them.

In the practice of the present invention, the solid catalyst component (A) is used preferably in an amount of from 0.001 to 2.5 mmol in terms of titanium atom per liter of the solvent or per liter of the inner volume of the reactor, and depending on the conditions, a higher concentration may be used.

The organoaluminum of the catalyst component (B) is used at a concentration of from 0.02 to 50 mmol, preferably from 0.2 to 5 mmol, per liter of the solvent or per liter of the internal volume of the reactor.

The polymerization of an olefin or of an olefin and other $\alpha$-olefin is conducted in a liquid phase or a gas phase. The polymerization is conducted under the condition substantially free from oxygen or water in the presence of or the absence of an inert gas.

When the polymerization is conducted in a liquid phase, it is preferable to use an inert solvent. As the inert solvent, any solvent commonly used in this technical field may be used, but particularly an alkane or an cycloalkane having 4 to 20 carbon atoms, for example, isobutane, pentane, hexane, heptane or cyclohexane is suitable. When the polymerization is conducted in a gas phase, it is conducted at a temperature below the melting point of the polymer.

The reactor to be used for the polymerization steps may be of any type which is commonly used in this technical field, for example, a fluidized bed reactor or a stirring tank type reactor. When the fluidized bed reactor is used in the gas phase polymerization, the reaction is conducted by blowing an olefin in the gas state and, as the occasion demands, an inert gas into the reaction system, thereby maintaining the reaction system in the state of fluid. As a stirrer when the stirring tank type reactor is used, various type of stirrers can be employed, for example, an anchor type stirrer, a screw type stirrer, a ribbon type stirrer and the like.

The polymerization of the present invention includes not only homopolymerization of an $\alpha$-olefin but also copolymerization of an $\alpha$-olefin with other $\alpha$-olefin. As the $\alpha$-olefin to be used for the polymerization, ethylene, propylene, 1-butene, 1-pentene, 1-hexene, 1-octene, 4-methyl-1-pentene are mentioned. Also, a copolymerization can be conducted by using a mixture of two or more of the above-mentioned $\alpha$-olefins. It is necessary to select the amounts of the $\alpha$-olefins to De used depending on the desired density of an objective polymer. It is possible to produce the polymer of the present invention whose density ranges from 0.890 to 0.970 g/cm$^3$.

The polymerization operation of the present invention can be carried out by not only one stage polymerization which is conducted under a common single polymerization condition, but also multistage polymerization which is conducted under plural polymerization conditions.

The polymerization of the present invention is conducted under polymerization conditions for a slurry or gas phase method at a polymerization temperature below the melting point of the polymer e.g. at a polymerization temperature of from 20° to 100° C., under a polymerization pressure of from 2 to 50 kg/cm$^2$G. The molecular weight can be controlled by a conventional means, e.g. a method in which an appropriate amount of hydrogen is present in a reaction system.

Now, the present invention will be described in further detail with reference to Examples. However, it should be understood that the present invention is by no means restricted by such specific Examples.

In the Examples and Comparative Examples, HLMI/MI stands for the ratio of the high-load melt index (HLMI; measured under the conditions of JIS K-6760 at 190° C. with a load of 21.6 kg) to the melt index (MI; measured under the conditions of JIS K-6760 at 190° C. with a load of 2.16 kg). The activity shows the produced amount (g) of a polymer per gram of the solid catalyst component (A).

With respect to the width of the particle size distribution of the polymer particles, the results of the classification of the polymer particles by sieves are plotted on a probability logarithmic paper to find the geometric standard deviation from the approximated straight line in known manner, and the width is expressed in terms of its common logarithm (hereinafter referred to as σ). The average particle size is a value obtained by reading the particle size corresponding to the weight accumulated value 50% of the above approximated line. The content of fine particles shows the ratio of fine particles having a particle size of 105 μm or less by weight %.

A short chain branching coefficient was quantified from a peak derived from a methyl group appeared at around 1378 cm$^{-1}$ in accordance with a Fourier transform infrared spectroscopy (FT-IR). The density was measured in accordance with JIS K-6760.

EXAMPLE 1

(a) Preparation of Solid Product 23 g (0.95 mol) of metal magnesium powder was placed in a 3 l flask equipped with a stirrer, a reflux condenser, a dropping tube and a thermometer, and then 1.15 g of iodine, 592.1 g (4.55 mol) of 2-ethylhexanol and 322.0 g (0.95 mol) of titanium tetrabutoxide were added. Then, the temperature was elevated to 85° C., and the mixture was stirred for 2 hours under sealing with nitrogen while removing the evolved hydrogen gas. Then, the temperature was elevated to 140° C., and the reaction was conducted at that temperature for further 2 hours under sealing with nitrogen. After cooling the mixture to 110° C., 95 ml of hexane was added, and further, after cooling it to 60° C., 39.2 g (0.14 mol) of diisobutyl phthalate was added. Then, the temperature was elevated to 70° C., and the reaction was continued at that temperature for 1 hour, thereby obtaining a homogeneous solution (a Mg—Ti solution) containing magnesium and titanium.

The homogeneous solution thus obtained was placed in a 500 ml flask in an amount of 0.062 mol in terms of Mg, and the temperature was kept at 45° C. After 47.0 ml (0.13 mol) of a 50% hexane solution of i-butylaluminum dichloride and 49.2 ml (0.62 mol) of 1,2-dichloroethane were added, the temperature was elevated to 70° C., at which stirring was continued for 1 hour, thereby obtaining a solid product. Hexane was added to the product, and washing was conducted 5 times.

(b) Preparation of Solid Catalyst Component (A)

After 10.9 g (0.0320 mol) of titanium tetrabutoxide was added to the solid product obtained in the above (a), stirring was conducted for 1 hour. Then, 96 ml (0.33 mol) of a 50% hexane solution of ethylaluminum dichloride was added over 2 hours. After completion of the addition, the temperature was elevated to 70° C., and the reaction was conducted at that temperature for 1 hour. Hexane was added to the product, and washing was conducted 5 times, thereby obtaining a solid catalyst component (A).

(c) Polymerization

The internal atmosphere of an electromagnetic stirring type reactor made of stainless steel having an internal volume of 2 l was replaced well with nitrogen, 1.2 l of hexane was charged thereinto, and the internal temperature was adjusted to 80° C. Thereafter, 0.223 g of triisobutylaluminum as the catalyst component (B) and 13 mg of the catalyst component (A) were successively added. After the internal pressure of the polymerization reactor was adjusted to 1 kg/cm$^2$G with nitrogen, 4 kg/cm$^2$ of hydrogen was added. While ethylene was continuously added so that the internal pressure of the autoclave would be 11.0 kg/cm$^2$G, the polymerization was carried out for 1.5 hours. After completion of the polymerization, the reactor was cooled, the unreacted gas was purged, and the polyethylene was taken out and separated from the solvent by filtering, followed by drying.

As a result, 460 g of polyethylene of a spherical shape having a melt index of 0.26 g/10 min, an HLMI/MI of 59 and a bulk density of 0.35 g/cm$^3$ was obtained. The catalytic activity corresponds to 35600 g/g catalyst. The average particle size was 690 μm, the proportion of fine particles having a particle size of 105 μm or less (hereinafter referred to as fine particle content) was 1.2% by weight, and σ was 0.18.

EXAMPLES 2 to 3

To the solid product obtained in (a) of Example 1, 21.7 g (0.0638 mol) of titanium tetrabutoxide was added in Example 2, or 4.2 g (0.0123 mol) of titanium tetrabutoxide was added in Example 3, and each mixture was reacted with 96.2 ml (0.31 mol) of a 50% hexane solution of ethylaluminum dichloride in the same manner as in (b) of Example 1, thereby obtaining a solid catalyst component (A). Polymerization of ethylene was carried out under the same condition as in (c) of Example 1 by using the solid catalyst component (A) thus obtained and triisobutylaluminum. The results are shown in Table 1.

EXAMPLE 4

6.11 g of a solid catalyst component (A) obtained in (b) of Example 1 was suspended in 400 ml of hexane in 2 l autoclave, and 16.64 g of triethylaluminum and 1.06 g of diphenyldimethoxysilane were added thereto. Then, propylene was supplied to the mixture while maintaining the pressure at 1 to 2 kg/cm$^2$G at a temperature of 0° C. to react 18.5 g of propylene, thereby prepolymerizing the solid catalyst component (A) with propylene.

Polymerization of ethylene was carried out under the same conditions as in (c) of Example 1 by using 0.23 g of triisobutylaluminum as a catalyst component (B) and 79 mg of a catalyst which was obtained by prepolymerizing, as above described, the solid catalyst component (A) with propylene (containing 20 mg of the solid catalyst component (A)). The results are shown in Table 1.

COMPARATIVE EXAMPLE 1

11 g (0.45 mol) of metal magnesium powder was placed in a 1.6 l autoclave equipped with a stirrer, and after 0.55 g of iodine, 70 g (0.94 mol) of n-butanol and 61 g (0.18 mol) of titanium tetrabutoxide were added thereto, the temperature was elevated to 80° C. The mixture was stirred for 1 hour under sealing with nitrogen while removing the evolved hydrogen gas. Then, the temperature was elevated to 120° C., and the reaction was continued at that temperature for 1 hour, thereby obtaining a Mg—Ti solution.

The Mg—Ti solution was charged into a flask having an internal volume of 500 ml in an amount of 0.048 mol in terms of Mg, the temperature was elevated to 45° C., and 116 ml of a 50% hexane solution of i-butylaluminum dichloride (0.31 mol) was added over 2 hours. After completion of the addition, the mixture was stirred for 1 hour at 70° C. Hexane was added to the product, and washing was conducted five times to obtain a solid catalyst component.

Polymerization of ethylene was carried out under the same conditions as in (c) of Example 1 by using 0.23 g of triisobutylaluminum and 20 mg of the solid catalyst component. The results are shown in Table 1.

COMPARATIVE EXAMPLE 2

86 ml of a 50% hexane solution of ethylaluminum dichloride (0.29 mol) was added to the solid product obtained in (a) of Example 1 over 2 hours. After completion of the addition, the temperature was elevated to 70° C., and the reaction was carried out at that temperature for 1 hour. Hexane was added to the product and washing was conducted five times to obtain a solid component. Polymerization of ethylene was carried out under the same conditions as in (c) of Example 1 by using 0.25 g of triisobutylaluminum and 20 mg of the solid component, but the catalytic activity was too low to evaluate the polymer.

COMPARATIVE EXAMPLE 3

3.2 g (0.0095 mol) of titanium tetrabutoxide was added to the solid product obtained in (a) of Example 1, and the mixture was stirred for 1 hour. Hexane was added to the product, and washing was conducted five times. Polymerization of ethylene was carried out under the same conditions as in (c) of Example 1 by using 20 mg of the solid component and 0.23 g of triisobutylaluminum, but no activity was shown.

EXAMPLE 5

The internal atmosphere of an electromagnetic stirring type reactor made of stainless steel having an internal volume of 2 l was well replaced with nitrogen, 200 g of sodium chloride which was dried at 200° C. for 30 hours was placed as a dispersion medium, and the internal temperature was controlled at 80° C. Then, 0.51 g of triisobutylaluminum as a catalyst component (B) and 80 mg of a catalyst which was obtained by prepolymerizing the solid catalyst component (A) obtained in Example 4 with propylene (containing 20 mg of the solid catalyst component (A)) were successively added. After the internal pressure of the polymerization reactor was adjusted to 1 kg/cm$^2$G with nitrogen, 6 kg/cm$^2$ of hydrogen was added, and while ethylene was continuously added so that the internal pressure of the autoclave would be 21.0 kg/cm$^2$G, the polymerization was carried out for 1.5 hours. After completion of the polymerization, the mixture was cooled, the unreacted gas was purged, and a mixture of the produced polymer and the sodium chloride was taken out. The mixture was washed with pure water to dissolve the sodium chloride and then dried to obtain a polymer.

As a result, 193 g of a polymer having a melt index of 0.31 g/10 min and an HLMI/MI of 42 was obtained. The catalytic activity corresponded to 9500 g/g catalyst. As a result, the bulk density was 0.41 g/cm³, the average particle size was 570 μm, σ is 0.22, and the content of fine particles was 1.8%.

EXAMPLE 6

The internal atmosphere of an electromagnetic stirring type reactor made of stainless steel having an internal volume of 2 liters was well replaced with nitrogen, 200 g of sodium chloride which was dried at 200° C. for 30 hours was placed, and the internal temperature was adjusted to 80° C. Then, 0.11 g of triisobutylaluminum as a catalyst component (B) and 78 mg of a catalyst obtained in Example 4 which was obtained by prepolymerizing the solid catalyst component (A) with propylene (containing 19 mg of the solid catalyst component (A)) were successively added thereto. After the internal atmosphere of the polymerization reactor was adjusted to 1 kg/cm²G with nitrogen, hydrogen was added so that the internal pressure would be adjusted to 6 kg/cm², and while adjusting butene-1/ethylene (molar ratio) in the gas phase to 0.35 and adding continuously ethylene and butene-1 so that the internal pressure of the autoclave would be adjusted to 21.0 kg/cm²G, polymerization was carried out for 1.5 hours. After completion of the polymerization, the reactor was cooled, the unreacted gas was purged, and a mixture of the produced polymer and the sodium chloride was taken out. The mixture was washed with pure water to dissolve sodium chloride and then dried to obtain a polymer.

As a result, 178 g of a-copolymer having a melt index of 4.55 g/10 min and an HLMI/MI of 30 was obtained. The catalytic activity corresponded to 9100 g/g catalyst. The bulk density was 0.39 g/cm³, the average particle size was 740 μm, σ was 0.18, and the content of fine particles was 0.1%. Also, the density was 0.925 g/cm³ and the ethyl branching number was 18.7 per 1000C.

EXAMPLE 7

(a) Preparation of Solid Product

A Mg—Ti solution obtained under the same conditions as in (a) of Example 1 was placed in a 500 ml flask in an amount of 0.088 mol in terms of Mg, and the temperature was adjusted to 45° C. After 65.2 ml of a 50% hexane solution of i-butylaluminum dichloride (0.18 mol) and 69.5 ml (0.88 mol) of 1,2-dichloroethane were added, the temperature was elevated to 70° C. at which stirring was conducted for 1 hour, thereby obtaining a solid product. Hexane was added to the solid product, and washing was conducted 5 times.

(b) Preparation of Solid Catalyst Component (A)

After 3.2 g (0.0095 mol) of titanium tetrabutoxide and 17.2 g (0.045 mol) of zirconium tetrabutoxide were added to the solid product obtained in the above (a), stirring was conducted for 1 hour, and then 129 ml of a 50% hexane solution of ethylaluminum dichloride (0.44 mol) was added over 2 hours. After completion of the addition, the temperature was elevated to 70° C., and the reaction was conducted at that temperature for 1 hour. Hexane was added to the product, and washing was conducted 5 times to obtain a solid catalyst component (A).

(c) Polymerization 5.90 g of the above solid catalyst component (a) was suspended in 400 ml of hexane in 2 l autoclave, and 3.85 g of triethylaluminum and 0.26 g of diphenyldimethoxysilane were added. Then, propylene was supplied while maintaining the pressure at from 1 to 2 kg/cm²G at 0° C., and 17.8 g of propylene was reacted, thereby prepolymerizing the solid catalyst component (A) with propylene.

The internal atmosphere of an electromagnetic stirring type reactor made of stainless steel having an internal volume of 2 l was well replaced with nitrogen, 1.2 l of hexane was charged thereinto, and the internal temperature was adjusted to 70° C. Then, 118 mg of triisobutylaluminum as a catalyst component (B) and 107 mg of a catalyst which was obtained by prepolymerizing, as above described, the solid catalyst component (A) with propylene (containing 27 mg of the solid catalyst component (A)) were successively added. After the internal pressure of the polymerization reactor was adjusted to 1 kg/cm²G with nitrogen, 13.3 kg/cm² of hydrogen was added. While ethylene was continuously added so that the internal pressure of the autoclave would be 20.0 kg/cm²G, the polymerization was conducted for 1.5 hours. After completion of the polymerization, the reactor was cooled, and the unreacted gas was purged, and the produced polymer was taken out, separated from the solvent by filtration and dried. As a result, 230 g of a polymer having a melt index of 0.045/10 min and an HLMI/MI of 134 was obtained, and the catalytic activity corresponded to 8600 g/g catalyst. The bulk density was 0.33 g/cm³, the average particle size was 720 μm, σ was 0.08, and the content of fine particles was 0%.

EXAMPLE 8

The internal atmosphere of an electromagnetic stirring type reactor made of stainless steel having an internal volume of 2 l was well replaced with nitrogen, 200 g of sodium chloride dried at 200° C. for 30 hours was charged as a dispersion medium for a catalyst, and the internal temperature was adjusted to 80° C. Then, 17 mg of triisobutylaluminum as a catalyst component (B) and 86 mg of a solid catalyst obtained in (c) of Example 7 which was obtained by prepolymerizing the solid catalyst component (A) with propylene (containing 22 mg of the solid catalyst component (A)) were successively added. After the internal pressure of the polymerization reactor was adjusted to 1 kg/cm²G with nitrogen, hydrogen was added so that the internal pressure would be 14 kg/cm². While ethylene was continuously added so that the internal pressure of the autoclave would be 21.0 kg/cm²G, polymerization was conducted for 1.5 hours. After completion of the polymerization, the reactor was cooled, the unreacted gas was purged, and a mixture of the produced polymer and the sodium chloride was taken out. The mixture was washed with pure water to dissolve the sodium chloride and then dried to obtain a polymer.

As a result, 103 g of a polymer having a melt index of 0.26 g/10 min and an HLMI/MI of 112 was obtained. The catalytic activity corresponded to 4800 g/g catalyst. The bulk density was 0.41 g/cm³, the average particle size was 570 μm, σ was 0.11, and the content of fine particles was 0.2%.

EXAMPLE 9

The internal atmosphere of an electromagnetic stirring type reactor made of stainless steel having an internal volume of 2 l was well replaced with nitrogen, 200 g of sodium chloride dried at 200° C. for 30 hours was charged thereinto as a dispersion medium for a catalyst, and the internal temperature was adjusted to 80° C. Then, 18 mg of triisobutylaluminum as a catalyst component (B) and 84 mg of a catalyst obtained in the above (c) of Example 7 which was obtained by prepolymerizing the catalyst component (A) with propylene (containing 21 mg of the solid catalyst component (A)) were successively added thereinto. After the internal pressure of the polymerization reactor was adjusted to 1 kg/cm$^2$G with nitrogen, hydrogen was added so that the internal pressure would be adjusted to 6 kg/cm$^2$. While ethylene and butene-1 were added so that butene-1/ethylene (molar ratio) in the gas phase would be adjusted to 0.35 and the internal pressure of the autoclave would be adjusted to 21.0 kg/cm$^2$G, the polymerization was conducted for 1.5 hours. After completion of the polymerization, the reactor was cooled, the unreacted gas was purged, and a mixture of the produced polymer and the sodium chloride was taken out. The mixture was washed with pure water to dissolve the sodium chloride and then dried to obtain a polymer.

As a result, 180 g of a copolymer having a melt index of 0.75/10 min and an HLMI/MI of 88 was obtained. The catalytic activity corresponded to 8400 g/g catalyst. The bulk density was 0.43 g/cm$^3$, the average particle size was 700 μm, σ was 0.13, and the content of fine particles was 0.1%. Also the density was 0.920 g/cm$^3$ and the ethyl branching number was 19.8 per 1000C.

EXAMPLE 10

(a) Preparation of Solid Product

A Mg—Ti solution obtained under the same conditions as in the above (a) of Example 1 was charged into a 500 ml flask in an amount of 0.066 mol in terms of Mg, 49.0 ml of a 50% hexane solution of i-butylaluminum dichloride (0.13 mol) and 52.2 ml (0.66 mol) of 1,2-dichloroethane were added thereto, and a solid product was obtained in the same manner as in the above (a) of Example 7. Hexane was added to the solid product, and washing was conducted five times.

(b) Preparation of Solid Catalyst Component (A)

The solid product obtained in the above (a) was reacted with 2.4 g (0.0071 mol) of titanium tetrabutoxide, 5.4 g (0.014 mol) of zirconium tetrabutoxide and 97.3 ml of a 50% hexane solution of ethylaluminum dichloride (0.34 mol) in the same manner as in the above (b) of Example 7 to obtain a solid catalyst component (A).

(c) Polymerization 5.03 g of the solid catalyst component (A) thus obtained was suspended in 400 ml of hexane in 2 l autoclave, and 5.41 g of triethylaluminum and 0.34 g of diphenyldimethoxysilane were added thereto. Then, propylene was supplied while maintaining the pressure at 1 to 2 kg/cm$^2$G at 30° C., and 15.1 g of propylene was reacted, thereby prepolymerizing the solid catalyst component (A) with propylene. The copolymerization of ethylene-butene-1 was carried out under the same conditions as in the above (c) of Example 9 by using a catalyst obtained by prepolymerizing the solid catalyst component (A) with propylene, and triisobutylaluminum. The results are shown in Table 2.

EXAMPLE 11

(a) Preparation of Solid Product

A Mg—Ti solution obtained under the same conditions as in the above (a) of Example 1 was charged into a 1 l flask in an amount of 0.144 mol in terms of Mg, the temperature was elevated to 45° C. After 106.8 ml of a 50% hexane solution of i-butylaluminum dichloride (0.29 mol) and 114.0 ml (1.44 mol) of 1,2-dichloroethane were added thereto, the temperature was elevated to 70° C. at which stirring was conducted for 1 hour to obtain a solid product. Hexane was added to the product, and washing was conducted five times.

(b) Preparation of Solid Catalyst Component (A)

After 24.2 g (0.0712 mol) of titanium tetrabutoxide and 15.5 g (0.0742 mol) of tetraethoxysilane were added to the solid product obtained in the above (a), stirring was conducted for 1 hour. Then, 267 ml of a 50% hexane solution of i-butylaluminum dichloride (0.72 mol) was added over 2 hours. After completion of the addition, the temperature was elevated to 70° C., and the reaction was conducted at that temperature for 1 hour. Hexane was added to the product, and washing was conducted five times to obtain a solid catalyst component (A).

(c) Polymerization

Polymerization of ethylene was carried out under the same conditions as in the above (c) of Example 1 by employing 0.18 g of triisobutylaluminum as a catalyst component (B) and 10 mg of the solid catalyst (A). The results are shown in Table 1.

EXAMPLES 12 to 13

In Example 12, 10.2 g (0.0300 mol) of titanium tetrabutoxide and 24.8 g (0.1188 mol) of tetraethoxysilane were added to the solid product obtained in (a) of Example 11, and 267.2 ml of a 50% hexane solution of i-butylaluminum dichloride (0.7200 mol) was reacted thereto in the same manner as in (a) of Example 11, whereas in Example 13, 23.3 g (0.0684 mol) of titanium tetrabutoxide and 3.6 g (0.0173 mol) of tetraethoxysilane were added to the solid product obtained in (a) of Example 11, and 267.3 ml of a 50% hexane solution of i-butylaluminum dichloride (0.7200 mol) was reacted thereto under the same conditions as in (a) of Example 11, thereby obtaining a solid catalyst component. Polymerization of ethylene was carried out under the same conditions as in (c) of Example 1 by using the solid catalyst component (A) and triisobutylaluminum. The results are shown in Table 1.

EXAMPLE 14

3.5 g of the solid catalyst component (A) obtained in (c) of Example 11 was suspended in 400 ml of hexane in 2l autoclave, and 8.76 g of triethylaluminum and 0.64 g of diphenyldimethoxysilane were added thereto. Then, propylene was supplied while maintaining the pressure at 1 to 2 kg/cm$^2$G at 0° C., and 10.5 g of propylene was reacted, thereby prepolymerizing the solid catalyst component (A) with propylene.

The polymerization of ethylene was carried out under the same conditions as in (c) of Example 1 by employing 0.056 g of triisobutylaluminum as a catalyst component (B) and 40 mg of a catalyst which was obtained by prepolymerizing, as above described, the solid catalyst component (A) with propylene (containing 10 mg of the solid catalyst component (A)). The results are shown in Table 1.

COMPARATIVE EXAMPLE 4

After a Mg—Ti solution was obtained under the same conditions as in Comparative Example 1, further 26 ml of methylhydropolysiloxane (having a viscosity of about 30 centistokes at 25° C.) (0.45 g atom of silicon) was compressingly charged thereinto with nitrogen at 120° C. Then, the reaction was conducted at 120° C. for 1 hour to obtain a reaction product.

A part of the above-mentioned reaction product was charged into a 500 ml flask (in such an amount that corresponds to 0.053 mol in terms of Mg and 0.053 g atom in terms of Si), the temperature was elevated to 45° C., and 108 ml of a 50% hexane solution of i-butylaluminum dichloride (0.29 mol) was added over 2 hours. After completion of the addition, the temperature was elevated to 70° C. at which stirring was conducted for 1 hour.

Hexane was added to the product, and washing was conducted 15 times in accordance with a decantation method. Thus, a slurry of the solid catalyst component suspended in hexane was obtained.

Polymerization of ethylene was carried out under the same conditions as in (c) of Example 1 by using 0.23 g of tri-i-butylaluminum and 15 mg of the solid catalyst component. The results are shown in Table 1.

COMPARATIVE EXAMPLE 5

After 4.9 g (0.0234 mol) of tetraethoxysilane was added to the solid product obtained in (a) of Example 11 in an amount of 0.046 mol in terms of Mg, stirring was conducted for 1 hour. After hexane was added to the product, and washing was conducted five times, polymerization of ethylene was carried out under the same conditions as in (c) of Example 1 by using 10 mg of the solid component and 0.18 g of triisobutylaluminum, but no activity was shown.

EXAMPLE 15

Polymerization of ethylene was carried out under the same conditions as in Example 5 by using 0.14 g of triisobutylaluminum as a catalyst component (B) and 40 mg of a catalyst which was obtained by prepolymerizing the solid catalyst component (A) obtained in Example 14 with propylene (containing 10 mg of the solid catalyst (A)). The results are shown in Table 2.

EXAMPLE 16

The internal atmosphere of an electromagnetic stirring type reactor made of stainless steel having an internal volume of 2 l was well replaced with nitrogen, 200 g of sodium chloride dried at 200° C. for 30 hours as a dispersion medium was charged thereinto, and the internal temperature was adjusted to 80° C. Then, 0.37 g of triisobutylaluminum as a catalyst component (B) and 38 mg of a catalyst which was obtained by prepolymerizing the solid catalyst component (A) obtained in Example 14 with propylene (containing 10 mg of the solid catalyst component (A)) were successively added thereto. After the internal pressure of the polymerization reactor was adjusted to 1 kg/cm$^2$G with nitrogen, hydrogen was added so that the internal pressure would be adjusted to 2 kg/cm$^2$. Then, while ethylene and butene-1 were continuously added so that butene-1/ethylene (molar ratio) in the gas phase would be adjusted to 0.22 and the internal pressure of the autoclave would be adjusted to 19.0 kg/cm$^2$G, the polymerization was carried out for 1.5 hours. After completion of the polymerization, the reactor was cooled, the unreacted gas was purged, and a mixture of the produced polymer and the sodium chloride was taken out. The mixture was washed with pure water to dissolve the sodium chloride and then dried to obtain a polymer.

As a result, 117 g of a copolymer having a melt index of 1.12 g/10 min and an HLMI/MI of 33 was obtained. The catalytic activity corresponded to 12500 g/g catalyst. The bulk density was 0.41 g/cm$^3$, the average particle size was 680 μm, σ was 0.13, and the content of fine particles was 0%. Also, the density was 0.920 g/cm$^3$ and the ethyl branching number was 16.5 per 1000C.

EXAMPLE 17

(a) Preparation of Solid Product

A Mg—Ti solution obtained under the same conditions as in (a) of Example 1 was charged into a 1 l flask in an amount of 0.140 mol in terms of Mg, the temperature was elevated to 45° C. Then, 103.6 ml of a 50% hexane solution i-butylaluminum dichloride (0.28 mol) and 110.4 ml (1.40 mol) of 1,2-dichloroethane were added thereto, and the temperature was elevated to 70° C. at which stirring was conducted for 1 hour to obtain a solid product. Hexane was added to the solid product, and washing was conducted five times.

(b) Preparation of Solid Catalyst Component (A)

After 4.7 g (0.0137 mol) of titanium tetrabutoxide, 10.5 g (0.027 mol) of zirconium tetrabutoxide and 2.8 ml (0.0136 mol) of tetraethoxysilane were added to the solid product obtained in the above (a), stirring was conducted for 1 hour. Then, 205.4 ml of a 50% hexane solution of ethylaluminum dichloride (0.70 mol) was added over 2 hours. After completion of the addition, the temperature was elevated to 70° C., and the reaction was conducted at that temperature for 1 hour. Hexane was added to the product, and washing was conducted five times to obtain a solid catalyst component (A).

(c) Polymerization

Polymerization of ethylene was carried out under the same conditions as in (c) of Example 7 by using 0.73 g of triisobutylaluminum as a catalyst component (B) and the solid catalyst component (A). The results are shown in Table 1.

EXAMPLE 18

(a) Preparation of Solid Product

A Mg—Ti solution obtained under the same conditions as in (a) of Example 1 was placed in a 1 l flask in an amount of 0.134 mol in terms of Mg, the temperature was elevated to 45° C., and then 94.3 ml of a 50% hexane solution of i-butylaluminum dichloride (0.25 mol) and 100.4 ml (1.27 mol) of 1,2-dichloroethane were added. Then, the temperature was elevated to 70° C. at which stirring was conducted for 1 hour to obtain a solid product. Hexane was added to the solid product, and washing was conducted five times.

(b) Preparation of Solid Catalyst Component (A)

After 2.5 g (0.0073 mol) of titanium tetrabutoxide, 24.7 ml (0.066 mol) of zirconium tetrabutoxide and 2.8 g (0.0134 mol) of tetraethoxysilane were added to the solid product obtained in (a), the mixture was stirred for 1 hour, and then 186.8 ml of a 50% hexane solution of ethylaluminum dichloride (0.63 mol) was added over 2 hours. After completion of the addition, the temperature was elevated to 70° C., and the reaction was conducted at that temperature for 1 hour. Hexane was added to the product, and washing was conducted five times to obtain a solid catalyst component (A).

(c) Polymerization 3.6 g of the above-mentioned solid catalyst component (A) was suspended in 400 ml of hexane in 2l autoclave, and 7.53 g of triethylaluminum and 0.64 g of diphenyldimethoxysilane were added thereto. Then, propylene was supplied while maintaining the pressure thereof at 1 to 2 kg/cm$^2$G at 0° C., and 10.8 g of propylene was reacted, thereby prepolymerizing the solid catalyst component (A) with propylene.

Polymerization of ethylene was carried out under the same conditions as in (c) of Example 8 by using 0.21 g of triisobutylaluminum as a catalyst component (B) and 121 mg of the solid catalyst component (A) (containing 30 mg of the solid catalyst component (At). The results are shown in Table 2.

EXAMPLE 19

Copolymerization of ethylene-butene-1 was carried out under the same conditions as in (c) of Example 9 by using 0.22 g of triisobutylaluminum as a catalyst component (B) and 120 mg of the solid catalyst component (A) obtained in Example 18 (containing 30 mg of the solid catalyst component (A)). The results are shown in Table 2.

EXAMPLES 20 to 22

Solid catalyst components (A) were obtained under the same conditions as in Example 1 except that titanium tetrabutoxide employed for the solid product obtained in (a) of Example 1, was replaced with titanium tetraisopropoxide in Example 20, titaniumtetraethoxide in Example 21, and titanium tetramethoxide in Example 22. Polymerization of ethylene was carried out under the same conditions as in (c) of Example 1 by using each of these solid catalyst components (A) and triisobutylaluminum. The results are shown in Table 3.

EXAMPLES 23 to 24

Preparation of solid catalyst components (A) were carried out under the same conditions as in Example 1 except that after titanium tetrabutoxide was added under the same conditions as in Example 1 to the solid product obtained in (a) of Example 1, isobutylaluminum dichloride was used in Example 23, and ethylaluminum sesquichloride was used in Example 24. Polymerization of ethylene was carried out under the same conditions as in (c) of Example 1 by using each of these solid catalyst component (A) and triisobutylaluminum. The results are shown in Table 3.

EXAMPLES 25 to 27

Preparation of solid catalyst components (A) were carried out under the same conditions as in Example 11 except that to the solid product obtained in (a) of Example 1, as a silicon compound, tetramethoxysilane was added in Example 25, silicon tetrachloride was added in Example 26, and methylhydropolysiloxane was added in Example 27. Polymerization-of ethylene was conducted under the same conditions as in (c) of Example 1 by using each of these solid catalyst component (A) and triisobutylaluminum. The results are shown in Table 3.

EXAMPLES 28 to 29

Preparation of solid catalyst components (A) were carried out under the same conditions as in Example 11 except that titanium tetrabutoxide added in Example 11 to the solid product obtained in (a) of Example 1 was replaced with titanium tetraisopropoxide in Example 28, and with titanium tetraethoxide in Example 29. Polymerization of ethylene was carried out under the same conditions as in (c) of Example 1 by using each of the solid catalyst components (A) and triisobutylaluminum. The results are shown in Table 3.

EXAMPLES 30 to 31

Preparation of solid catalyst components (A) were carried out under the same conditions as in Example 11 except that after titanium tetrabutoxide and tetraethoxysilane were added, under the same conditions as in Example 11, to the solid product obtained in (a) of Example 1, ethylaluminum dichloride was added in Example 30, and ethylaluminum sesquichloride was added in Example 31. Polymerization of ethylene was carried out under the same conditions as in (c) of Example 1 by using any one of these solid catalyst components (A) and triisobutylaluminum. The results are shown in Table 3.

EXAMPLES 32 to 34

Synthesis of solid catalyst components (A) was carried out in the same manner as in Example 7 except that the compound as the reactant (V) to be used in the production of the solid catalyst component (A) was changed as follows: Titanium tetrabutoxide and zirconium tetrabutoxide used in Example 7 were replaced with titanium tetrapropoxide and zirconium tetrabutoxide in Example 32, with titanium tetraethoxide and zirconium tetrabutoxide in Example 33, and with titanium tetrabutoxide and zirconium tetrapropoxide in Example 34, thereby preparing solid catalyst components (A). After these solid catalyst components (A) were prepolymerized in the same manner as in Example 4, copolymerization for ethylene-butene-1 was carried out under same conditions as in Example 9 by using catalysts which were obtained by prepolymerizing the solid catalyst components (A) with propylene, and triisobutylaluminum. The results are shown in Table 4.

EXAMPLES 35 to 36

Solid catalyst components (A) were prepared under the same conditions as in Example 17 except that to the solid product obtained in (a) of Example 1, as a silicon compound, tetramethoxysilane was added in Example 35, and dimethylpolysiloxane was added in Example 36. After these solid catalyst components (A) were prepolymerized in the same manner as in Example 4, copolymerization of ethylene-butene-1 was carried out under the same conditions as in Example 9 by using catalysts which were obtained by prepolymerized the solid catalyst components (A) with propylene, and triisobutylaluminum. The results are shown in Table 4.

EXAMPLE 37

Synthesis of a solid catalyst component (A) was carried out in the same manner as in Example 18 except that the compound as the reactant (V), which was used for the preparation of the solid catalyst component (A), was changed as follows: Titanium tetrabutoxide and zirconium tetrabutoxide used in Example 18 were replaced with titanium tetrapropoxide and zirconium tetrabutoxide to prepare a solid catalyst component (A). After this solid catalyst component (A) was prepolymerized in the same manner as in Example 4, copolymerization of ethylene-butene-1 was carried out under the same conditions as in Example 9 by using a catalyst which was obtained by prepolymerizing the catalyst component (A) with propylene, and triisobutylaluminum. The results are shown in Table 4.

TABLE 1

|  | Activity (g/g) | MI (g/10 min) | HLMI/MI | Bulk density (g/cm³) | Content of fine particles (wt %) | σ | Average particle size (μm) |
|---|---|---|---|---|---|---|---|
| Example 1 | 35600 | 0.26 | 59 | 0.35 | 1.2 | 0.18 | 690 |
| Example 2 | 46600 | 0.12 | 63 | 0.29 | 0.4 | 0.16 | 610 |
| Example 3 | 24600 | 0.57 | 48 | 0.37 | 1.6 | 0.16 | 630 |
| Example 4 | 31800 | 0.40 | 42 | 0.39 | 0.3 | 0.18 | 640 |
| Example 7 | 8600 | 0.045 | 134 | 0.33 | 0 | 0.08 | 720 |
| Example 11 | 37800 | 0.12 | 63 | 0.36 | 1.4 | 0.12 | 1080 |
| Example 12 | 28900 | 0.14 | 70 | 0.32 | 0.4 | 0.10 | 940 |
| Example 13 | 32500 | 0.12 | 57 | 0.36 | 1.2 | 0.13 | 1060 |
| Example 14 | 36800 | 0.56 | 43 | 0.40 | 0.8 | 0.11 | 1080 |
| Example 17 | 8400 | 0.089 | 124 | 0.35 | 1.5 | 0.11 | 630 |
| Comparative Example 1 | 16000 | 0.18 | 48 | 0.34 | 55.7 | 0.56 | 95 |
| Comparative Example 4 | 19700 | 0.86 | 43 | 0.37 | 12.4 | 0.47 | 340 |

TABLE 2

|  | Activity (g/g) | MI (g/10 min) | HLMI/MI | Bulk density (g/cm³) | Content of fine particles (wt %) | σ | Average particle size (μm) | Density (g/cm³) | Ethyl branching number (number/1000 C.) |
|---|---|---|---|---|---|---|---|---|---|
| Example 5 | 9500 | 0.31 | 42 | 0.41 | 1.8 | 0.22 | 570 | — | — |
| Example 6 | 9100 | 4.55 | 30 | 0.39 | 0.1 | 0.18 | 740 | 0.925 | 18.7 |
| Example 8 | 4800 | 0.26 | 112 | 0.41 | 0.2 | 0.11 | 570 | — | — |
| Example 9 | 8400 | 0.75 | 88 | 0.43 | 0.1 | 0.13 | 700 | 0.920 | 19.8 |
| Example 10 | 10800 | 3.39 | 64 | 0.37 | 0 | 0.17 | 760 | 0.915 | 24.8 |
| Example 15 | 7000 | 1.00 | 40 | 0.41 | 0.5 | 0.12 | 660 | — | — |
| Example 16 | 12500 | 1.12 | 33 | 0.41 | 0 | 0.13 | 680 | 0.920 | 16.5 |
| Example 18 | 4000 | 0.26 | 115 | 0.41 | 0 | 0.12 | 660 | — | — |
| Example 19 | 5400 | 1.76 | 76 | 0.47 | 0 | 0.12 | 880 | 0.917 | 20.1 |

TABLE 3

|  | Activity (g/g) | MI (g/10 min) | HLMI/MI | Bulk density (g/cm³) | Content of fine particles (wt %) | σ | Average particle size (μm) |
|---|---|---|---|---|---|---|---|
| Example 20 | 34700 | 0.34 | 53 | 0.35 | 0.9 | 0.17 | 640 |
| Example 21 | 34200 | 0.23 | 55 | 0.34 | 1.3 | 0.17 | 650 |
| Example 22 | 31200 | 0.38 | 52 | 0.35 | 1.3 | 0.17 | 640 |
| Example 23 | 35000 | 0.15 | 59 | 0.32 | 0.4 | 0.16 | 610 |
| Example 24 | 33800 | 0.28 | 55 | 0.34 | 1.0 | 0.17 | 640 |
| Example 25 | 37300 | 0.20 | 61 | 0.33 | 1.7 | 0.14 | 930 |
| Example 26 | 30000 | 0.27 | 54 | 0.32 | 1.8 | 0.14 | 950 |
| Example 27 | 33700 | 0.18 | 56 | 0.31 | 0.6 | 0.13 | 1050 |
| Example 28 | 36800 | 0.25 | 55 | 0.35 | 0.9 | 0.11 | 1020 |
| Example 29 | 36300 | 0.22 | 60 | 0.34 | 1.1 | 0.12 | 960 |
| Example 30 | 37200 | 0.13 | 63 | 0.36 | 0.2 | 0.09 | 1050 |
| Example 31 | 35900 | 0.11 | 63 | 0.33 | 0.7 | 0.10 | 980 |

TABLE 4

|  | Activity (g/g) | MI (g/10 min) | HLMI/MI | Bulk density (g/cm³) | Content of fine particles (wt %) | σ | Average particle size (μm) | Density (g/cm³) | Ethyl branching number (number/1000 C.) |
|---|---|---|---|---|---|---|---|---|---|
| Example 32 | 8000 | 1.59 | 69 | 0.41 | 0.1 | 0.12 | 700 | 0.919 | 19.2 |
| Example 33 | 8400 | 2.20 | 73 | 0.42 | 0.1 | 0.09 | 760 | 0.919 | 21.5 |
| Example 34 | 8500 | 1.28 | 84 | 0.43 | 0.1 | 0.11 | 730 | 0.920 | 18.3 |
| Example 35 | 5400 | 1.22 | 73 | 0.45 | 0 | 0.14 | 810 | 0.916 | 18.9 |
| Example 36 | 5300 | 1.09 | 76 | 0.43 | 0 | 0.12 | 920 | 0.915 | 22.0 |
| Example 37 | 5700 | 1.51 | 76 | 0.46 | 0 | 0.13 | 870 | 0.920 | 19.4 |

A first effect of the present invention resides in that the improvement of the powder properties of the polymer are remarkable, and that it is suitable particularly for gas phase polymerization as well as for slurry polymerization. That is, according to the present invention, it is possible to obtain a polymer containing no substantial amount of fine particles and having a proper average particle size with a high bulk density. Further, it is also possible to obtain a polymer having an extremely narrow particle size distribution. Therefore, the dispersibility of the polymer in the polymerization system is good. These merits are industrially very significant. That is, in the polymerization step, formation of substances deposited in the polymerization apparatus can be inhibited, separation of the polymer can be facilitated, and scattering of fine particles of the polymer out of the system can be prevented. Further, in the transportation step, no bridge will be formed in the cylo, and troubles involved in the transportation can be eliminated. Further, it becomes possible to provide a polymer having a uniform quality.

The second effect of the present invention is that the polymerization activities are very high, and it is possible to obtain a polymer which does not require a deashing step intended for the removal of the remaining catalyst. Since the catalyst is highly active, the product is free from coloration or odor, and no purification of the polymer will be required. Therefore, this is economically very advantageous.

The third effect of the present invention resides in that the molecular weight distribution can be easily controlled by the amounts of the reactants to be used for the production of the catalyst, particularly the ratio of the amounts of two or more oxygen-containing organic compounds of the reactants (V). Therefore, it is possible to produce polymers having various properties with ease by the action of catalyst by themselves.

We claim:

1. A method for producing a polyolefin in the presence of a catalyst comprising a transition metal compound and an organometallic compound, which comprises: polymerizing an olefin in the presence of a catalyst which comprises:

(A) a solid catalyst component prepared by reacting a homogeneous solution containing (I) (i) a combination of magnesium metal and at least one hydroxylated organic compound, (ii) at least one oxygen-containing organic compound of magnesium, or (iii) a combination of (i) and (ii), (II) an electron donating compound selected from the group consisting of an ether, an ester, a ketone, a phenol, an amine, an amide, an imine, a nitrile, a phosphine and an arsine, and (III) an oxygen-containing organic compound of titanium, with (IV) at least one aluminum halide compound, thereby obtaining a solid product which is freed from unreacted substances and by-products by filtration or decantation, and which has a magnesium atom (component I) to titanium atom (component III) atomic ratio ranging from 1:0.01 to 1:20, and adding to this solid product (V) at least one compound selected from the group consisting of oxygen-containing organic compounds of at least one transition metal of group IVb of the Periodic Table, and then treating the mixture with (VI) an aluminum halide compound, and (B) at least one catalyst component selected from the group consisting of organoaluminum compounds.

2. The method according to claim 1, wherein the reactant (II) is an ester.

3. The method according to claim 1, wherein the reactant (III) is a compound of the formula $[TiO_a(OR^1)_b X^1_c]_m$ wherein $R^1$ is a hydrocarbon group having from 1 to 20 carbon atoms, $X_1$ is a halogen atom, a, b and c are such that $a \geq 0$, $b > 0$ and $4 > c \geq 0$ and they are numbers agreeable with the valence of titanium, and m is an integer.

4. The method according to claim 1, wherein the aluminum halide compound for each of reactants (IV) and (VI) is a compound of the formula $AlR^2_k X^2_{3-k}$ wherein $R^2$ is a hydrocarbon group having from 1 to 20 carbon atoms, $X^2$ is a halogen atom, and k is a number of $0<k<3$.

5. The method according to claim 1, wherein the reactant (V) is a compound of the formula $[MO_p(OR^3)_q X^3_j]$ wherein M is a transition metal of Group IVb of the Periodic Table, $R^3$ is a hydrocarbon group having from 1 to 20 carbon atoms, $X^3$ is a halogen atom, p, q and j are such that $p \geq 0$, $q > 0$ and $4 > j \geq 0$ and they are numbers agreeable with the valence of M, and n is an integer.

6. The method according to claim 1, wherein the molar ratio of the electron donative compound (II) to the magnesium atom of the reactant (I) is from 0.05 to 5; the atomic ratio of the-aluminum atom of the reactant (IV) to the magnesium atom of the reactant (I) is from 0.01 to 100; the atomic ratio of the metal atom of the reactant (V) to the magnesium atom of the reactant (I) is from 0.01 to 10; and the atomic ratio of the aluminum atom of the reactant (VI) to the magnesium atom of the reactant (I) is from 0.02 to 100.

7. The method according to claim 1, wherein the solid product is washed with an inert solvent before the addition of the reactant (V).

8. The method according to claim 1, wherein the catalyst component (B) is selected from the group consisting of tri-$C_1$-$C_{20}$ alkyl aluminum, $C_1$-$C_{20}$ alkyl aluminum halides and $C_1$-$C_{20}$ alkyl aluminum alkoxides.

9. The method according to claim 1, wherein, when the polymerization is conducted in the liquid phase or in the gas phase in the presence or absence of a solvent in a polymerization reactor, the solid catalyst component (A) is used in an amount corresponding to 0.001 to 2.5 mmols of titanium atom per liter of the solvent or of the internal volume of the reactor, and the catalyst component (B) is used in an amount corresponding to 0.02 to 50 mmols of the organoaluminum compounds per liter of the solvent or of the internal volume of said reactor.

10. The method according to claim 1, wherein said hydroxylated organic compound is an alcohol, an organic silanol or a phenol.

11. The method according to claim 1, wherein the reactant (I) is at least one member selected from the group consisting of magnesium alkoxides, magnesium alkylalkoxides, magnesium hydroalkoxides, magnesium phenoxides, magnesium carboxylates, magnesium oxymates, magnesium hydroxamate salts, magnesium hydroxylamine salts, magnesium enolates, magnesium complexes of phenol derivatives having an electron donating group at the o- or m-position to the hydroxyl group, magnesium silanolates and complex alkoxides and phenoxides of magnesium with other metals.

* * * * *

UNITED STATES PATENT AND TRADEMARK OFFICE
CERTIFICATE OF CORRECTION

PATENT NO. : 5,629,390
DATED : May 13, 1997
INVENTOR(S) : Sadaki NISHIMURA, et al.

It is certified that error appears in the above-indentified patent and that said Letters Patent is hereby corrected as shown below:

On the title page, item [73], should read:

--[73] Assignee: Tosoh Corporation, Shinnanyo, Japan--

Signed and Sealed this

Fifth Day of August, 1997

Attest:

BRUCE LEHMAN

Attesting Officer

Commissioner of Patents and Trademarks